United States Patent [19]

Rutherford

[11] 4,337,077
[45] Jun. 29, 1982

[54] AGRICULTURAL INOCULANT COMPOSITION

[76] Inventor: Joseph P. Rutherford, 3203 Rocks Chrome Hill Rd., Jarrettsville, Md. 21084

[21] Appl. No.: 185,557

[22] Filed: Sep. 9, 1980

[51] Int. Cl.³ .................... C05F 11/02; C05F 11/08
[52] U.S. Cl. .................................... 71/9; 71/21; 71/24; 71/901; 71/904; 47/9; 47/58; 47/DIG. 7; 435/253
[58] Field of Search ................ 71/6, 8–10, 71/21, 22, 23, 24, 28, 901, 904; 47/9, 58, DIG. 7; 435/253

[56] References Cited

U.S. PATENT DOCUMENTS

| | | | |
|---|---|---|---|
| 1,228,587 | 6/1917 | Nash | 71/21 X |
| 2,117,087 | 5/1938 | Formhals | 71/18 |
| 3,934,999 | 1/1976 | Meier | 71/9 |

FOREIGN PATENT DOCUMENTS 713855  2/1980  U.S.S.R. ................................ 71/23

Primary Examiner—S. Leon Bashore, Jr.
Assistant Examiner—Ferris H. Lander
Attorney, Agent, or Firm—Morton J. Rosenberg

[57] ABSTRACT

An agricultural inoculant composition used as a seed, plant, foilar spray, field spray, and compost inoculant. The agricultural inoculant composition includes both a peat humus base composition having predetermined quantities of peat moss, leather meal, granite meal, Calcium Phosphate, tobacco meal, animal manure, kelp, greensand, liquid seaweed, and bacterial inoculant. Additionally, a liquid seaweed base composition is mixed with the peat humus base composition and the liquid seaweed base composition includes a combination of liquid seaweed, carbohydrates and polysaccharides, vitamins, as well as liquid alfalfa. The agricultural inoculant has been found to increase both the quality and yield of various types of plant products when such is used either as a seed or plant inoculant.

16 Claims, No Drawings

4,337,077

AGRICULTURAL INOCULANT COMPOSITION

BACKGROUND OF THE INVENTION

1. Field of the Invention

This invention pertains to an agricultural inoculant composition and method of producing same for increasing both the quality and yield of various agricultural products. In particular, this invention pertains to a combination of a peat humus base mixture and a seaweed base mixture for providing seed, plant, foilar spray, field spray, and compost inoculants. More in particular, this invention pertains to an agricultural inoculant which includes a peat humus base composition having a predetermined mixture of peat moss, leather meal, granite meal, Calcium Phosphate, tobacco meal, animal manure, and bacterial inoculant. Still further, this invention relates to a particular type of seed base composition which includes liquid seaweed, carbohydrates and polysaccharides, vitamins and liquid alfalfa. More in particular, this invention relates to the combination of the seaweed base composition with peat humus base compositions having been fermented to particular types of standards.

2. Prior Art

Agricultural inoculant compositions and methods of producing such have been known in the prior art. The best prior art known to the inventor includes U.S. Pat. Nos.: 1,228,587; 3,940,257; 2,070,658; 4,174,957; 3,140,921; 3,561,943; 103,085; 3,422,569; 4,013,440; 4,084,938; and 2,974,030.

In particular, reference U.S. Pat. No. 1,228,587 directs itself to a fertilizing system which utilizes both peat humus in combination with ocean vegetation. The peat humus is initially dried and maintained on a floor member. A layer of seed vegetation is placed on the peat humus and the seed vegetation which is seaweed, is absorbed within the peat humus. Thus, such prior art references of this nature do provide for combinations of peat humus and seaweed. However, it does not appear that such prior art references provide for the peat humus base composition to go through the various fermenting processes as described in the subject inventive concept, and further does not include the total combination of peat moss, leather meal, granite meal, Calcium Phosphate, tobacco meal, animal manure and bacterial inoculant, as is provided by the subject inventive concept.

In prior art reference U.S. Pat. No. 3,940,257, such as directed to a soil conditioning fertilizing compound where the basic composition is composed of particulate seaweed mixed with particulate tree bark. This prior art reference particularly directs itself to the fact that the tree bark is substantially different from peat moss in that peat moss has a capacity to absorb the seaweed liquid in a much less degree than the tree bark. Additionally, the seaweed composition of the reference is substantially different than the overall composition of the inventive concept which includes liquid seaweed, carbohydrates and polysaccharides, vitamins and liquid alfalfa, as forming the overall mixture.

In other prior art references directed to fertilizers, such as U.S. Pat. No. 2,070,658, it is seen that such utilizes wet peat which is heated in a furnace and deposited into bins. Such is mixed with what is termed as plant material and although plant materials have many properties in common, this reference does not provide for the seaweed base composition as provided in the subject inventive concept.

In other prior art references, such as U.S. Pat. No. 4,174,957, there is provided a synthetic growing medium wherein peat humus is ground to a powder. Subsequent to the grinding, a liquid wetting agent is sprayed onto the humus and the wetting agent carrying humus powder is mixed with foam granules which is a mixture of urea formaldehyde. Such prior art compositions as provided by this reference do show the grinding of peat humus to a powder, but does not provide for the overall composition of the combination of the peat humus base composition and the seaweed base composition, as is necessary to the inventive concept.

SUMMARY OF THE INVENTION

An agricultural inoculant composition which includes a peat humus base mixture formed into a combination of peat moss, leather meal, granite meal, Calcium Phosphate, tobacco meal, animal manure, kelp, greensand, liquid seaweed, and bacterial inoculant. The peat humus base composition is mixed or blended with a seaweed base mixture which includes a combination of liquid seaweed, carbohydrates and polysaccharides, vitamins, as well as liquid alfalfa. The seaweed base composition and the peat humus base composition are blended together in predetermined quantities to provide the overall agricultural inoculant composition of the subject invention concept.

DESCRIPTION OF THE PREFERRED EMBODIMENTS

Referring to the invention concept, there is provided both an agricultural inoculant composition and method of producing same for the purposes of providing increased fertilization agricultural systems. In overall concept, the subject agricultural inoculant composition is used as an inoculant for seeds, plants, foilar spray, field spray, and compost. As will be described in following paragraphs, as well as test results provided herein, the use of the subject agricultural inoculant composition has greatly increased both the yield and the quality of agricultural products treated.

In general, a seed inoculant is defined as introducing a bacteria, enzyme, or hormone onto an external surface of seeds in order to promote advanced germination of the seeds for the purposes of increasing the respiratory activity of the seeds upon planting. When the subject agricultural inoculant composition is applied to a plant, such has been found useful for anti-stress in order to promote increased growth directing itself to the speed of the growth and to the overall increase in the yield.

When the subject agricultural inoculant composition is used as a seed inoculant, such is administered in the generally acceptable manner wherein the seed is initially dampened with standard tap water. The agricultural inoculant composition which is a dehydrated powder is spread over a plurality of seeds in the usual ratio of one tablespoon of agricultural inoculant composition powder per pound of seed for normal garden crops. The seeds are agitated either manually or through mechanical means until substantially all of the agricultural inoculant composition powder covers the seeds. The seeds are then prepared for the standard planting procedure.

The subject agricultural inoculant composition includes two base compositions blended together in predetermined weight and volume percentages to be described in following paragraphs. Each of the base compositions are prepared separately and will be described in the following disclosure. Initially, a peat humus base composition is formed which generally includes peat moss, leather meal, granite meal, Calcium Phosphate, tobacco meal, animal manure, kelp, greensand, liquid seaweed, and bacterial inoculant. Secondly, a seaweed base composition is formed which includes a mixture of liquid seaweed, carbohydrates, and polysaccharides, vitamins, and liquid alfalfa. Separate blending and fermentation processes as well as mixing of the two base compositions will be described in detail in the following paragraphs.

Referring to the peat humus base composition mixture, such is initiated with a commercial grade of peat moss produced by Premier Peat Corporation, having a pH value within the approximate range of 4.0-5.0. This type of peat moss is commonly known in the art as a German type peat moss and is utilized due to the alkaline reaction of the liquid seaweed base composition which is subsequently blended or mixed with the peat humus base composition herein described.

The weight percentage of the peat moss used in the formation of the peat humus base composition is within the approximate range of 45.0%-55.0% by weight of the total peat humus base composition with a preferred weight percentage of the peat moss being approximately 48.5% of the total peat humus base composition weight.

Leather meal having a high Nitrogen base is then provided and such contains approximately 10.0% Nitrogen to stimulate bacterial growth when the composting process to be described in following paragraphs is begun. The leather meal is commercially available and has the commercial name Nitro 10.

The weight percentage of the leather meal in the peat humus base composition is generally formed within the weight percentage of 10.0%-20.0% of the total peat humus base composition and has a preferred weight percentage of approximately 12.0%.

Granite meal which is a ground stone type powder commercially available, is a hybrid type granite susceptible to biological action during the aforementioned composting process. The weight percentage of the granite meal is approximately within the range of 1.0%-10.0% of the total weight composition of the peat humus base composition and has a preferred weight percentage approximating 5.0%.

Commercially available Calcium Phosphate is inserted into the peat humus base composition and such is generally a colloidal type Phosphate which includes approximately 22.0% total Phosphoric Acid. The Calcium Phosphate is commercially available, and increases the overall pH value of the mixture composition which heightens the pH in the composting process and adds to the Phosphorus content of the final mixture.

The overall approximate weight percentage range of the Calcium Phosphate to the total weight of the peat humus base composition is between 1.0%-10.0% with a preferred weight composition percentage approximating 2.5% of the tital peat humus base composition mixture.

Tobacco meal which is purchased commercially includes ground-up tobacco stems, tobacco stalks, and leaves. The potash content is regulated to the approximate range between 6.0%-8.0% by weight of the total amount of tobacco meal being used in the peat humus base composition. The overall weight percentage range of the tobacco meal to the total weight of the peat humus base composition lies within the approximate range of 1.0%-10.0%, with a preferred weight percentage approximating 6.0% of the total weight of the peat humus base composition.

Animal manure obtained naturally from stables or other naturally occurring locations is then mixed into the overall composition. In the formation of the peat humus base composition, a high grade animal manure is used. The term high grade animal manure or cow manure is commercially known in the art and is defined in that the animals are not in the grazing period, but are corn fed and are maintained in a feed lock for 90.0%-95.0% of their normal lifetime.

Utilization of the animal manure is generally for the production and generation of heat in order to break down the peat into a stable type peat humus. The overall weight percentage of animal manure being used in the peat humus base composition when taken with respect to the total weight of the peat humus base composition has been found useful within the approximate range of 20.0%-30.0%, with a preferred weight percentage approximating 24.0%.

Kelp which is generally known as a variety of large brown seaweed from the family of Laminariales and Fucales, is then added to the intermediate mixture. The amount of kelp being used provides for various additions of trace minerals and vitamins. The amount of kelp when taken with respect to the total weight of the peat humus base composition has been found useful within the approximate range of 0.5%-5.0%, with a preferred weight percentage approximating 0.75%.

Greensand which is generally a sedimentary deposit consisting largely of dark greenish grains of Glauconite often mingled with clay or sand, is then mixed into the composition. The greensand is generally used for increasing the Iron content of the composition mixture. The amount of greensand added to the peat humus base composition is approximately within the range of 0.5%-5.0% of the total weight of the peat humus base composition, with a preferred weight percentage approximating 0.60%.

Liquid seaweed is added to the peat humus base composition and generally is prepared in the manner to be described in following paragraphs when the seaweed base composition is defined. However, approximately one gallon per 2,000 pounds of peat humus base composition is provided of the liquid seaweed which approximates 0.1%-5.0% of the total peat humus base composition weight. The preferred weight percentage of the liquid seaweed introduced into the peat humus base composition approximates 0.25%.

The aforementioned peat moss, leather meal, granite meal, Calcium Phosphate, tobacco meal, animal manure, kelp, greensand, and liquid seaweed are then blended or mixed in quantity. The mixing may either be manually or mechanically using a well-known type of system such as a front-end loader, or some like mechanism.

A bacterial inoculant which is non-pathogenic degrading and Nitrogen fixing micro-flora, including Cellulose and Hemi-Cellulose hydrolyzing enzymes is then added to the above-referenced intermediate peat humus base composition. Approximately ten grams of the bacterial inoculant are used in connection with 2,000 pounds of peat humus base composition total weight. This may include what is commonly termed a trace amount, however, useful percentages in the amount of 0.0053% have been used.

Although it is commonly used in the field of art as bacterial inoculant, the overall composition includes the following bacteria and fungi: Pseudomonadaceae; Actinomycetes; Streptomycetaceae; Gram Negative Chemolithotropics; Bacillaceae; Norcardiaceae; Phycomycetes; Ascomycetes; Bacillus Subtilis; Actinomycetes; Basidiomycetes; Fungi Imperfecti; Zygomycetes; Halobacteriaceae; Methano Bacteriaceal; Nitro Bacteraceae; Mycorrohiza; Azotabacter; Rhizobium; and, Blue-Green Algae. Enzymes which are identifiable in the final agricultural inoculant composition include the following: Cellulases; Hemicellulase; Protease; Amylase; Phenyloxgenase; Peroxygenase; Cytases; Pentosonases; Lipase; and, Waxolytic.

The average amount of bacteria used on the intermediate peat humus base composition approximates 10 mg. in a nutrient solution. The bacteria is then sprayed onto the mixture which will subsequently be composted. The peat humus base composition including the bacteria inoculant is then mixed or blended by manual or mechanical means through a frontend loader or some like type device.

The second base composition which in combination with the peat humus base composition makes up the overall agricultural inoculant composition is a seaweed base composition which includes liquid seaweed, carbohydrates, and polysaccharides, vitamins, and liquid alfalfa.

Initially, commercially dehydrated seaweed is used. One such type of seaweed purchased in dehydrated form is commercially available from Maxicrop Corporation of Chicago, Ill. Water is then added to the dehydrated seaweed in order to re-hydrate such for forming the seaweed/water mixture. In the following paragraphs, all weight percentages are directed to the weight and volume included for the formation of 1.0 gallons of liquid seaweed.

In the formation of the liquid seaweed base composition, as herein defined, approximately 10.7 ounces of dehydrated seaweed powder is added to approximately 1.0 gallons of water. The dehydrated seaweed powder is inserted into the water base and is blended therewith either manually or mechanically. The method of blending the dehydrated seaweed powder is not important to the inventive concept as herein described, with the exception that the blending process should provide a dispersed mixture of seaweed powder within the water base.

A mixture of carbohydrates and polysaccharides are then included in the following approximate weight: Mannose, 1.0 grams; Maltose, 0.5 grams; Lactose, 0.5 grams; Dextrose, 2.0 grams; Soytone, 1.0 gram; E.D.-T.A., 0.5 grams; Kinetin, 1.0 gram; Tryptone, 1.0 gram; Malt Extract, 10.0 grams; Sorbitol, 2.0 grams; Mannitol, 25.0 grams; Proteinase, 2.0 grams; Commercial Grade of Algae Broth, 3.0 grams; Calcium Carbonate, 5.0 grams; Amylopectin, 1.0 gram; Gibberlic Acid, 3.0 milligrams; Yeast Extract, 10.0 grams; Inositol, 0.5 grams; Proteous Peptone, 25 milligrams; Cellobiose, 25 milligrams; Casamino Acid, 1.0 gram; Levulose, 1.0 gram; Rhamnose, 1.0 gram; Xylose, 1.0 gram; Adonitol, 1.0 gram; Sodium Molybdate, 2.0 milligrams; and, Arabinose, 3.0 grams.

The seaweed base composition further includes the introduction of vitamins into the mixture being formed. The vitamin ingredients include: Vitamin A; Betacaratene; Vitamin B1; Vitamin B2; Vitamin B12; Pantothenic Acid; Folic Acid; Vitamin E, Folinic Acid; and, Vitamin K. The approximate amount of the vitamin additions includes: Vitamin A, approximately 10,000 I.U.; Betacaratene, 1.0 grams; Vitamin B1, 5.0 mg.; Vitamin B2, 5.0 mg.; Vitamin B12, 50.0 mg.; Pantothenic Acid, 1.0 C.C.; Folic Acid, 1.0 mg.; Folinic Acid, 0.5 mg.; Vitamin E, 100.0 I.U.; and, Vitamin K, approximately 1.0 mg.

The final element added into the intermediate composition ultimately forming the liquid seaweed base composition in the above-referenced paragraphs, is the introduction of liquid alfalfa. Green chop alfalfa is used and is commonly known as alfalfa which is cut from the field while such is still growing green.

Approximately 6.0 ounces of alfalfa is added to 1000.0 ml. of distilled water. The alfalfa and water is introduced into a standard laboratory blender, and the contents are blended into a liquid green viscous type composition. This results in a liquid alfalfa wherein approximately 500.0 ml. are added to the above-referenced composition mixture.

It is to be understood that the green chop alfalfa includes the original vitamins, minerals and proteins from the soil during the growing period. The use of green chop alfalfa is important, in that if dry alfalfa were utilized, there would be an extensive loss of the protein content in the volatile vitamins. Distilled water is generally used in the formation of this sub-composition in that there is a desire to negate any introduction of foreign minerals into the overall liquid seaweed base composition.

Subsequent to the production of the liquid alfalfa, as has hereinbefore been described, the vitamins, liquid seaweed, carbohydrates and polysaccharides, as well as the liquid alfalfa, are then blended mechanically in a standard laboratory blender.

The resulting liquid is a thick viscous type composition which appears darkened in color.

Referring to the method of producing the overall agricultural inoculant composition of the subject inventive concept, the peat humus base composition including peat moss, leather meal, granite meal, Calcium Phosphate, tobacco meal, animal manure, kelp, greensand, liquid seaweed, and bacterial inoculant are blended together to form the initial peat humus base composition, as has been described in previous paragraphs.

The peat humus base composition is then wetted with a non-chlorinated water in the amount of approximately 100.0 gallons per 1.0 ton of peat humus base composition. Spring water is used in order that chlorine is not added to the peat humus base composition.

Subsequent to wetting with the non-chlorinated water, the peat humus base composition is then agitated or mixed, either manually or mechanically, through an agitation process well-known in the art.

The peat humus base composition is then covered with a plastic material in order to retain the heat that is being generated by the bacterial inoculant which breaks down the remaining mixture of the peat humus base composition. The covering is generally waterproof and formed of a plastic-like material to prevent rain water from penetrating through to the peat humus base composition.

The peat humus base composition, at this point in the process, is placed or has been placed in external environment in order to allow solar rays to impinge on the covering and provide a heating base to the composition. Generally, a black plastic covering is used in order to maintain a high solar absorptivity in order to maximize the amount of heat being retained within the peat humus base composition during the fermentation period.

Initial fermentation of the peat humus base composition is initiated and maintained in the external environment for approximately 14.0 days.

Subsequently to the initial fermentation period, the plastic covering is removed. The partially fermented peat humus base composition is then aerated by mechanical means, or manually by hand, with a fork, or on a large basis through the use of a tractor or a front-end loader. Aeration generally continues for approximately 1.0 hours.

Subsequent to the aeration of the peat humus base composition, such is once again covered with the non-porous covering, as has hereinbefore been described.

A second fermentation period in the external environment is then entered, and the peat humus base composition is maintained in such state during the second fermentation period for approximately 14.0 days.

Temperatures of the peat humus base composition are analyzed and the temperature is maintained below 160.0° F. through the fermentation period. In the event that the temperature of the peat humus base composition rises above the limit of 160.0° F., additional non-chlorinated water is added to the overall composition to substantially halt the composting or fermentation process. This must be done due to the fact that higher temperatures than the approximate temperature of 160.0° F. have been found to kill beneficial bacteria which is needed during the second fermentation period.

Additionally, the pH of the peat humus base composition is continually analyzed during the second fermentation period, and has been found generally to begin with the pH value within the approximate range of 3.0–4.0. After approximately 5.0 days of the second fermentation period, the peat humus base composition generally has a rise in the pH value to approximately 7.5–8.0.

In approximately 10.0–12.0 days, subsequent to the initiation of the second fermentation period, the pH value has been found to stabilize at approximately 6.0. During this time interval, the pH value is continually analyzed and if such drops below the 5.0–5.5 range, hydrated lime is added to the fermenting or composted mixture to bring such into the neutral range.

Subsequent to the initial and secondary fermentation periods which is generally within a time interval of 20.0–30.0 days, the plastic covering is removed and the composted peat humus base composition is dried through natural convection.

The composted mass is naturally dried due to the fact that it has been found that artificial heat destroys the beneficial bacteria. The overall composition is then aerated and air dried by the aforementioned natural means which is a combination of solar rays and air currents.

The peat humus base composition is continually checked for a moisture content and after a 32.0% moisture is found, the peat humus base composition is ground to a fine powder. The grinding may be through the use of a laboratory hammermill, and such is ground to a point such that 95.0% passes through a 100 mesh screen.

The seaweed base composition, as previously described, is then blended to the fine powder peat humus base composition. The particular length of time that blending is accomplished is not important to the inventive concept with the exception that the blending is continued until the powdered peat humus base composition is fully mixed with the seaweed base composition. Approximately 250 ml. of seaweed base composition is combined with 135.0 grams of peat humus base composition during the blending process and such makes up the final agricultural inoculant composition. Subsequent to the blending process, the blended material of both peat humus base composition powder and seaweed base composition is oven-dried until a 10.0% moisture factor is achieved.

The drying process generally takes between 2.0–6.0 hours at a temperature of approximately 90.0° F., in a laboratory oven. It has been beneficial to use a laboratory oven that includes air flow which insures that temperatures will not rise to the point that vitamins will be cooked out of the composition. Additionally, the air flow has been found to assist in the drying process. Subsequent to the drying to the 10.0% moisture factor, the overall agricultural inoculant composition is packaged for use as has been previously described.

EXPERIMENT I

A set of tests were conducted using the agricultural inoculant composition as herein described as a seed inoculant. The tests were run on soybean seeds with the strain being Williams. The seeding rate was 1.0 bushels per acre and the agricultural inoculant composition had a final pH value of 6.8. The peat humus base composition included the following weight percentages of ingredients based upon the total weight of the peat humus base composition:

| Ingredient | Percentage |
| --- | --- |
| Peat Moss | 48.6% |
| Leather Meal | 12.15% |
| Granite Meal | 4.86% |
| Calcium Phosphate | 2.43% |
| Tobacco Meal | 6.08% |
| Animal Manure | 24.30% |
| Kelp | 0.73% |
| Greensand | 0.61% |
| Liquid Seaweed | 0.24% |
| Bacterial Inoculant | 0.00053% |

The seaweed base composition including liquid seaweed, carbohydrates and polysaccharides, vitamins and liquid alfalfa, was prepared in the same manner as previously described, and in approximate weight and volume percentages as shown in previous paragraphs.

The seaweed base composition and peat humus base composition were mixed in accordance with the volume and weight combinations of 135.0 grams of peat humus in combination with 250.0 ml. of liquid seaweed base composition. The total blended composition was air dried in a laboratory oven to achieve a 10.0% moisture factor in the finished product.

Control plots of 1.0 acre were used with test plots of also 1.0 acre size. The following table shows the number of yield bushels from both the control and test plots as well as the percent of increase in the test when the agricultural inoculant composition was used as a seed inoculant:

TABLE 1

| TEST SET NO. | CONTROL PLOT YIELD (Bushels) | TEST PLOT YIELD (Bushels) | TEST PLOT % INCREASE |
| --- | --- | --- | --- |
| 1 | 35 | 44 | 24.7% |
| 2 | 33 | 39 | 18.1% |

TABLE 1-continued

| TEST SET NO. | CONTROL PLOT YIELD (Bushels) | TEST PLOT YIELD (Bushels) | TEST PLOT % INCREASE |
|---|---|---|---|
| 3 | 32 | 36 | 12.8% |

EXPERIMENT II

A set of tests were conducted using the agricultural inoculant composition as herein described as a foilar spray. The tests were run on Williams strain type soybean seeds. The seeding rate was 1.0 bushels per acre, and the agricultural inoculant composition had a final pH value of 6.8. The peat humus base composition included the following weight percentages of ingredients based upon the total weight of the peat humus base composition:

| Peat Moss | 50.0% |
|---|---|
| Leather Meal | 10.0% |
| Granite Meal | 10.0% |
| Calcium Phosphate | 1.0% |
| Tobacco Meal | 2.0% |
| Animal Manure | 20.0% |
| Kelp | 5.0% |
| Greensand | 1.0% |
| Liquid Seaweed | 1.0% |
| Bacterial Inoculant | 0.00053% |

The seaweed base composition was formed by using seaweed purchased in dehydrated form as previously described. Approximately 10.7 ounces of dehydrated seaweed powder was added to approximately 1.0 gallons of water and blended therewith. A mixture of carbohydrates and polysaccharides as previously described were included in the approximate weights as shown in the previous paragraphs of the disclosure. Vitamins in the approximate amount as described were added and liquid alfalfa was produced by the mixture of 6.0 ounces of alfalfa being added to 1000.0 ml. of distilled water.

The seaweed base composition and peat humus base composition were mixed in accordance with the volume and weight combinations of approximately 135.0 grams of peat humus in combination with 250.0 ml. of liquid seaweed base composition. The total blended composition was then air dried in a laboratory oven to achieve an approximate 10.0% moisture factor in the finished product.

Control plots of 1.0 acre were used with test plots being of the 1.0 acre size. The following table describes the number of yield bushels from both the control and test plots as well as the percentage increase in the test plots when the agricultural inoculant composition was used as a seed inoculant:

TABLE 2

| TEST SET NO. | CONTROL PLOT YIELD (Bushels) | TEST PLOT YIELD (Bushels) | TEST PLOT % INCREASE |
|---|---|---|---|
| 1 | 35 | 48 | 37.1% |
| 2 | 33 | 41 | 24.2% |
| 3 | 32 | 39 | 21.8% |

EXPERIMENT III

A set of tests were conducted using the agricultural inoculant composition as herein described as a composition sprayed on soil as a nutrient for fertilizing systems. The crop upon which the composition was used was soybean having a strain of Williams. The seeding rate was 1.0 bushels per acre and the agricultural inoculant composition had a final pH value of 6.8. The peat humus base composition included the following approximate weight percentages of ingredients based upon the total weight of the peat humus base composition:

| Peat Moss | 55.0% |
|---|---|
| Leather Meal | 10.0% |
| Granite Meal | 1.0% |
| Calcium Phosphate | 1.0% |
| Tobacco Meal | 1.0% |
| Animal Manure | 30.0% |
| Kelp | 0.5% |
| Greensand | 0.5% |
| Liquid Seaweed | 1.0% |
| Bacterial Inoculant | 0.00053% |

The seaweed base composition including liquid seaweed, carbohydrates and polysaccharides, vitamins and liquid alfalfa was prepared in the same manner as previously described and in the approximate weight and volume percentages as shown in previous paragraphs.

As in the other experiments, the seaweed base composition and peat humus base composition were mixed in accordance with the volume and weight combinations of approximately 135.0 grams of peat humus in combination with 250.0 ml. of liquid seaweed base composition. The total blended composition was air dried in a laboratory oven to provide an approximate 10.0% moisture factor in the finished product.

Control plots and tests plots of 0.25 acres were used. The following table shows the number of yield bushels from both the control and test plots, as well as the percent of increase in the test yield when the agricultural inoculant composition was used as a nutrient for the fertilizing systems.

TABLE 3

| TEST SET NO. | CONTROL PLOT YIELD (Bushels) | TEST PLOT YIELD (Bushels) | TEST PLOT % INCREASE |
|---|---|---|---|
| 1 | 33 | 37 | 12.1% |
| 2 | 33 | 38 | 15.1% |
| 3 | 33 | 36 | 9.0% |
| 4 | 33 | 37 | 12.1% |
| 5 | 32 | 39 | 21.8% |
| 6 | 32 | 40 | 25.0% |
| 7 | 32 | 38 | 18.7% |
| 8 | 32 | 41 | 28.1% |

EXPERIMENT IV

A set of tests were conducted using the agricultural inoculant composition as herein described as a compost inoculant. The overall composition had a pH value of 6.6 and was introduced into a standard compost. The Nitrogen, Phosphorous, and potash were tested after introduction of the agricultural inoculant composition was introduced. The control product was a commercially available product having a Trademark "FERTILIFE".

The following table describes the values of Nitrogen, Phosphorous and potash in pounds per 100 pounds of compost.

TABLE 4

| TEST # | CONTROL PRODUCT | TEST PRODUCT | % INCREASE |
|---|---|---|---|
| 1 Nitrogen | 1.2 | 2.3 | 91.6% |

TABLE 4-continued

| TEST # | CONTROL PRODUCT | TEST PRODUCT | % INCREASE |
|---|---|---|---|
| (N$_2$) | | | |
| 2 Phosphorous (P$_2$O$_5$) | 1.0 | 2.0 | 81.8% |
| 3 Potash (K$_2$O) | 1.1 | 2.0 | 81.8% |

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended claims.

What is claimed is:

1. An agricultural inoculant composition including:
   (a) a peat humus base mixture consisting essentially of predetermined weight percentages of peat moss, leather meal, granite meal, Calcium Phosphate, tobacco meal, animal manure, kelp, greensand, liquid seaweed, and bacterial inoculant; and,
   (b) a liquid seaweed base mixture consisting essentially of liquid seaweed, carbohydrates and polysaccharides, vitamins and liquid alfalfa, said liquid seaweed base mixture being blended with said peat humus base mixture in the approximate amount of 250.0 ml. of said liquid seaweed base mixture to 135.0 grams of said peat humus base mixture.

2. The agricultural inoculant composition as recited in claim 1 where said peat humus base mixture includes the following approximate weight percentage ranges of 45.0%–55.0% peat moss; 10.0%–20.0% leather meal; 1.0%–10.0% granite meal; 1.0%–10.0% Calcium Phosphate; 1.0%–10.0% tobacco meal; 20.0%–30.0% animal manure; 0.5%–5.0% kelp; 0.5%–5.0% greensand; 0.1%–5.0% liquid seaweed; and, a trace amount of bacterial inoculant, said weight percentages being taken with respect to the total weight of said peat humus base mixture.

3. The agricultural inoculant composition as recited in claim 2 where said peat humus base mixture includes the following approximate weight percentages: 48.6% peat moss; 12.15% leather meal; 4.86% granite meal; 2.43% Calcium Phosphate; 6.08% tobacco meal; 24.30% animal manure; 0.73% kelp; 0.61% greensand; 0.24% liquid seaweed; and, a trace amount of bacterial inoculant.

4. The agricultural inoculant composition as recited in claim 1 where said liquid seaweed includes approximately 10.7 ounces of dehydrated seaweed powder blended with approximately 1.0 gallons of water.

5. A method of producing an agricultural inoculant composition including the steps of:
   (a) forming a peat humus base mixture consisting essentially of predetermined weight percentages of peat moss, leather meal, granite meal, Calcium Phosphate, tobacco meal, animal manure, kelp, greensand, liquid seaweed, and bacterial inoculant;
   (b) initially fermenting said peat humus base mixture;
   (c) aerating said initially fermented peat humus base mixture;
   (d) secondarily fermenting said peat humus base mixture;
   (e) maintaining said peat humus base mixture below a predetermined temperature at which beneficial bacteria would become ineffective during said secondary fermenting; and,
   (f) blending said secondarily fermented peat humus base mixture with a liquid seaweed base mixture consisting essentially of liquid seaweed, carbohydrates and polysaccharides, vitamins and liquid alfalfa.

6. The method of producing an agricultural inoculant composition as recited in claim 5 where the step of forming a peat humus base mixture includes the step of wetting said peat humus base mixture with non-chlorinated water in the approximate amount of 100.0 gallons of said water to approximately 2000.0 pounds of said peat humus base mixture.

7. The method of producing an agricultural inoculant composition as recited in claim 6 where the step of wetting is followed by the step of mixing said wetted peat humus base mixture.

8. The method of producing an agricultural inoculant composition as recited in claim 5 where the step of initially fermenting includes the step of locating said peat humus base mixture in an external environment adapted to be impinged by solar rays.

9. The method of producing an agricultural inoculant composition as recited in claim 8 where the step of locating said peat humus base mixture includes the step of covering said peat humus base mixture with a waterproof material.

10. The method of producing an agricultural inoculant as recited in claim 9 where the step of covering includes the step of providing a high solar absorptivity for said peat humus base mixture.

11. The method of producing an agricultural inoculant composition as recited in claim 10 where said waterproof covering material is plastic.

12. The method of producing an agricultural inoculant composition as recited in claim 11 where the step of initially fermenting includes the step of maintaining said peat humus base mixture in said external environment for approximately 14.0 days.

13. The method of producing an agricultural inoculant composition as recited in claim 5 where the step of secondarily fermenting said peat humus base mixture includes the step of locating said peat humus base mixture in an external environment for a predetermined time interval.

14. The method of producing an agricultural inoculant composition as recited in claim 13 where the step of locating said peat humus base mixture is followed by the step of monitoring the temperature of said peat humus base mixture during said predetermined time interval.

15. The method of producing an agricultural inoculant composition as recited in claim 14 where the step of monitoring includes the step of maintaining said temperature of said peat humus base mixture below an approximate temperature of 160.0° F.

16. The method of producing an agricultural inoculant composition as recited in claim 15 where the step of monitoring includes the step of stabilizing the pH value of said peat humus base mixture to a predetermined value within the approximate range of between 6.0–7.0.

* * * * *